Patented Apr. 1, 1952

2,590,834

UNITED STATES PATENT OFFICE 2,590,834

PLASTICIZED POLYVINYLIDENE CHLORIDE COMPOSITIONS

Donald Faulkner, Cambridge, and Johann Josef Peter Staudinger, Ewell, England, assignors to The Distillers Company, Limited, Edinburgh, Scotland, a British company No Drawing. Application December 3, 1946, Serial No. 713,850. In Great Britain December 6, 1945

10 Claims. (Cl. 260—33.6)

This invention is for improvements in or relating to new compositions of matter containing polymerisation products and compounding ingredients such as plasticisers, stabilisers and the like. It is more specifically concerned with the production of compositions containing polymers and copolymers derived from asymmetrical 1:1:dichloroethylene, hereinafter referred to as vinylidene chloride, which compositions show improvements over the said polymers and copolymers themselves.

It has already been proposed to modify the properties of such polymerisation products by admixing them with various compounds. For example, their plasticity has been improved by admixture with various substances, such as phthalic acid esters and their stability by admixture with various lead compounds.

One object of the present invention is to provide new compositions having good stability to heat and light and at the same time a high degree of flexibility and plasticity, so that they are particularly suitable for the production of articles with good ageing properties by the processes of moulding, rolling, extruding and the like.

We have now found that this and related objects may be readily attained according to the present invention which provides a composition comprising a polymer or copolymer of vinylidene chloride and a dimer or trimer of styrene or an alkyl or halogen derivative thereof or mixtures of said dimers and/or trimers. The copolymers of vinylidene chloride may be those obtained by copolymerisation with one or more other known polymerisable compounds, such as vinyl chloride, vinyl esters, vinyl ketones, vinyl ethers, acrylic esters, methacrylic esters or acrylonitrile.

Among the alkyl or halogen derivatives of styrene which are suitable for conversion to the dimers or trimers there may be mentioned the nuclear substituted styrenes, such as the o-, m-, and p-vinyl toluenes, vinyl xylenes and o-, m-, and p-chloro-styrenes. Styrene derivatives containing alkyl substituents in the side chain such as alpha-methyl styrene are also suitable. These compounds may be converted to their dimers or trimers or mixtures thereof in any suitable manner, for example, by the process described in Example 2 of British Patent Specification No. 524,156.

The proportion of the di- or trimeric compound or mixture thereof to the polymer or copolymer of vinylidene chloride may be varied according to the properties required in the final composition. In practise, we have found that a wide range of desirable properties is obtained by the use of an amount of the dimer or trimer or mixture thereof of between 1% and 35% by weight of the final product. In some cases, advantages may be obtained by the addition of other already-known stabilisers or plasticisers to the composition of the present invention.

The compositions of the present invention may be formed in any convenient manner, for example, the polymer or copolymer of vinylidene chloride may be mixed with the styrene or styrene derivative polymer on heated rolls or the polymerised product may be thoroughly mixed with a solution of the di- or trimeric compound or compounds in the cold and the solvent subsequently removed by evaporation; alternatively the said dimer or trimer or a mixture thereof may be added to the reaction mixture before polymerisation is effected.

The following examples illustrate the manner in which the invention may be carried into effect, the percentage figures quoted being calculated as percentages by weight:

*Example 1.*—600 grm. alpha-methyl styrene, diluted with 600 grm. xylene were heated under reflux and small quantities of active clay were added from time to time in lots of about 1–2 grm. as the reaction slackened. When about 30 grm. had been added during 1½ hours the reaction was substantially complete. The mixture was filtered while still hot and the filtrate was distilled under 15 mm. Hg pressure until the temperature reached 95° C. The distillate, amounting to 630 grm., consisted mainly of xylene containing a little alpha-methyl styrene. The residue, a pale yellow syrupy liquid, was divided into two parts, A and B, the latter (260 grm.) being subjected to further distillation under 0.5 mm. Hg pressure. The following fractions were obtained.

| Fraction | Boiling point, °C. | Refractive index | Molecular weight | Percent unsaturation |
|---|---|---|---|---|
| $B_1$ | 90–95 | 1.5679 | 244 | 52 |
| $B_2$ | 95–97 | 1.5691 | 248 | 78 |
| $B_3$ | 111–135 | 1.5709 | 249 | 64 |
| $B_4$ | 135–155 | 1.5752 | 290 | 58 |
| $B_5$ | 155–192 | | 334 | 34 |

The molecular weights of the fractions were determined cryoscopically in 2% benzene solution. Unsaturation was determined by bromine addition, making allowance for any substitution reaction.

Fractions $B_1$ to $B_3$ were substantially dimers of alpha-methyl styrene, the differences in refractive index and bromine absorption being due to the presence of isomerized and cyclized dimer. Fractions B₁ to B₃ were therefore bulked together and cooled to —15° C. and allowed to stand for 24 hours at this temperature. During this time some crystals formed and were filtered off, washed with methanol and dried. The melting point of these crystals was 51° C. corresponding to that of dimethyl-phenyl-hydrindene or the cyclic isomer of dimerised alpha-methyl styrene.

The following materials were used for the compounding tests:
1. Crude reaction mixture (A)
2. Mixed dimer (fractions B₁–B₃)
3. Cyclized dimer, M. P. 51° C. (solid removed from fractions B₁–B₃)
4. Non-cyclicized dimer (liquid after removal of crystalline dimer)
5. Mixture of dimer and trimer (fraction B₄)
6. Trimer (fraction B₅).

A standard composition, prepared from a copolymer of a mixture of 90% vinylidene chloride and 8% vinyl chloride and 2% acrylonitrile, by mixing thoroughly 8.5 grm. of the copolymer with 1.5 grm. of the compounding agent was used. The mixture was placed into a mould and pressed at 185° to 190° C. for 1 minute to give a disc of 1 mm. thickness and the following results obtained, comparison being made with a disc prepared from 8.5 grm. copolymer and 1.5 grm. tricresylphosphate.

| Test | Compounding agent | Colour | Flexibility | Remarks |
| --- | --- | --- | --- | --- |
| 1 | Tricresylphosphate. | Light brown | Quite satisfactory. | Flowed well, but had occluded bubbles. |
| 2 | Crude mixture. | Yellow | Good | Flowed readily. |
| 3 | Mixed dimer | do | do | Do. |
| 4 | Cyclicized dimer. | Yellowish green. | do | Flowed very readily. |
| 5 | Noncyclicized dimer. | Pale yellow. | do | Flowed readily. |
| 6 | Mixture of dimer and trimer. | Straw | Quite good | Do. |
| 7 | Trimer | do | do | Do. |

*Example 2.*—A styrene dimer was prepared by the method described by Fitting and Erdmann, in Annalen, 216, 182, by refluxing cinnamic acid with 50% sulphuric acid.

Discs of about 1 mm. thickness obtained from mixtures of polyvinylidene chloride and the styrene dimer in varying proportions using a mould at 190° C. for 2 minutes gave the following results:

| Test | Polyvinylidene chloride, percent | Styrene dimers, percent | Colour of disc | Flexibility of disc |
| --- | --- | --- | --- | --- |
| 1 | 100 | 0 | Dark brown. | Brittle. |
| 2 | 95 | 5 | Very light brown. | Still brittle. |
| 3 | 85 | 15 | Yellow | Bendable. |
| 4 | 75 | 25 | Pale yellow. | Flexible. |
| 5 | 65 | 35 | Translucent pale straw. | Do. |

*Example 3.*—A styrene dimer was prepared as follows: 150 grams of styrene was run into a boiling mixture of 500 cc. chlorobenzene, 3 grams of p-toluenesulphonic acid, and 3 grams of pyrogallol, the addition requiring 5 hours. After refluxing for a further 10 hours, the reaction mixture was cooled, washed with water, and the chlorobenzene removed by distillation at 15 mm. pressure. Distillation of the residue at 2 mm. pressure gave the following fractions:

| Fraction | Boiling Range | Weight |
| --- | --- | --- |
|  | °C. | g. |
| 1 | 110–140 | ¹82 |
| 2 | 140–165 | 2 |
| 3 | 165–185 | ²18 |
| Residue (soft-resin) |  | 46 |
| Total |  | 148 |

¹ Crude styrene dimer.
² Crude styrene trimer.

Fraction 1 was redistilled through a column, and the fraction boiling at 90–100°/1 mm. collected as styrene dimer. This material had refractive index $n_D^{20}=1.5930$ and an unsaturation value of 91.3%.

Styrene dimer having properties practically identical with those quoted above was also obtained by using a catalyst prepared by reacting 1 mole of ethylene glycol with 0.9 mole of sulphuric acid in place of the p-toluenesulphonic acid.

When using a copolymer, prepared from a mixture of 85% of vinylidene chloride and 15% of methyl acrylate, together with 10% of the styrene dimer, prepared as above, and pressing a disc under conditions identical with those of Example 2, a very pale yellow, transparent disc of very good flexibility was obtained.

*Example 4.*—A mixture of ortho- and para-chloro-styrenes, diluted with an equal volume of ethylbenzene was refluxed and small amounts of active clay, which had been dried previously to less than 1.0% moisture content were added. When the addition of further clay no longer caused signs of increased boiling of the mixture, the reaction was interrupted, the hot syrupy liquid filtered and the filtrate distilled under a pressure of 20 mm. Hg to remove the diluent and unreacted monomer. Further distillation under reduced pressure did not give any clear-cut fractions, the bulk boiling over a range of about 60° C. There was also a resinous residue, which could not be distilled and which on cooling sets to a brownish tacky resin.

The molecular weight of the bulk fraction, when determined cryoscopically, corresponded to a mixture of dimer and trimer in the approximate proportion of 70:30. This mixture was added to a copolymer of 94% vinylidene chloride, 4% vinyl chloride and 2% acrylonitrile in varying proportions and extruded and the temperature noted at which the material began to flow easily. The following results were obtained:

| Test | Copolymer of vinylidene chloride, percent | Mixture of chlorostyrene dimer and trimer, percent | Extrusion temperatures, °C. | Colour of thread |
| --- | --- | --- | --- | --- |
| 1 | 95 | 5 | 180–185 | Light brown. |
| 2 | 90 | 10 | 172–176 | Do. |
| 3 | 80 | 20 | 166–170 | Pale yellow. |
| 4 | 70 | 30 | about 155 | Do. |

*Example 5.*—p-Methylstyrene dimer was prepared by the method described in Example 3 for the preparation of styrene dimer, using the condensation product of ethylene glycol and sulphuric acid as catalyst. The p-methylstyrene dimer possessed the following properties:

Boiling point, 105–111° C./1 mm.
Refractive index, $n_D^{20}=1.5739$

Unsaturation value, 46.8%
6.5 grams of this dimer was emulsified with:
100 cc. distilled water
1.5 grm. sodium salt of sulfated lauryl alcohol
0.5 grm. polyvinyl alcohol
0.4 grm. potassium per-sulphate
Sufficient sodium hydrogen phosphate/citric acid buffer to bring the pH of the mixture to 5.5
45 cc. vinylidene chloride
5.0 cc. isobutyl acrylate
0.2 grm. crotonyl peroxide.

The emulsion was heated to 45° C. for 92 hours by which time the polymerisation was substantially complete. The polymer emulsion was broken by the addition of dilute formic acid and the precipitated polymer thoroughly washed with warm water; after drying at 50° C. under pressure of 60 mm. Hg 49 grm. of polymer were obtained. Part of this polymer was used at 180° C. for the formation of a disc (A) as in the previous examples and this disc compared with one (B) made from a copolymer prepared under identical conditions with the exception that no dimer of p-methyl styrene was added to the polymerising system.

| Disc | Colour | Flow properties | Flexibility |
| --- | --- | --- | --- |
| A | Pale yellow | Flowed readily | Bendable. |
| B | Brownish | Contained gas bubbles. | Somewhat brittle. |

It will be observed from the foregoing examples that the dimeric and trimeric styrene and styrene derivatives served the dual functions of stabilising and plasticising the vinylidene chloride polymers and copolymers.

What we claim is:

1. A plasticized polymeric material, said material consisting essentially of a major proportion of vinylidene chloride units in its molecular structure and at least one low polymer of the class consisting of dimers and trimers of a compound selected from the group consisting of styrene, alpha-methyl styrene, nuclear methyl substituted styrenes and nuclear chlorine substituted styrenes.

2. A plasticized material as set forth in claim 1, wherein said low polymer is present in said polymeric material to the extent of 1% to 35% of the weight of said material and said low polymer.

3. A plasticized material as set forth in claim 2, wherein said low polymer is dimeric styrene.

4. A plasticized material as set forth in claim 2, wherein said low polymer is trimeric styrene.

5. A plasticized material as set forth in claim 2, wherein said low polymer is selected from the group consisting of dimers and trimers of alpha-methyl styrene.

6. A plasticied material as set forth in claim 2, wherein the polymeric material is a copolymer of vinylidene chloride, vinyl chloride and acrylonitrile in which the vinylidene chloride is present in a major proportion with respect to said vinyl chloride and acrylonitrile.

7. A plasticized material as set forth in claim 2, wherein the polymeric material is a copolymer of vinylidene chloride and an alkyl acrylate, said vinylidene chloride being in a major proportion with respect to said acrylate.

8. A plasticiped material as set forth in claim 1, wherein the polymeric material comprises at least 85% vinylidene chloride units in its molecular structure.

9. A process for the production of plasticized synthetic resin compositions which comprises polymerizing a polymerisable material consisting essentially of a major proportion of vinylidene chloride in the presence of at least one low polymer of the class consisting of dimers and trimers of a compound selected from the group consisting of styrene, alpha-methyl styrene, nuclear methyl substituted styrenes and nuclear chlorine substituted styrenes in amount of 1% to 35% by weight of the mixture of vinylidene chloride and said low polymer.

10. A process for the production of a plasticized composition which comprises incorporating at least one low polymer material into polymeric material having a major proportion of vinylidene chloride units in its molecular structure, the composition consisting essentially of said low polymer material and said material having vinylidene chloride units, said low polymer being selected from the class consisting of dimers and trimers of a compound selected from the group consisting of styrene, alpha-methyl styrene, nuclear methyl substituted styrenes and nuclear chlorine substituted styrenes in an amount of 1% to 35% by weight of the mixture of said polymeric material and said low polymer.

DONALD FAULKNER.
JOHANN JOSEF PETER STAUDINGER.

REFERENCES CITED

The following references are of record in the file of this patent:

UNITED STATES PATENTS

| Number | Name | Date |
| --- | --- | --- |
| 2,160,932 | Wiley | June 6, 1939 |
| 2,384,973 | Smith | Sept. 18, 1945 |
| 2,404,781 | Arnold et al. | July 30, 1946 |
| 2,450,027 | Warner et al. | Sept. 28, 1948 |

FOREIGN PATENTS

| Number | Country | Date |
| --- | --- | --- |
| 497,001 | Great Britain | Dec. 6, 1938 |
| 506,160 | Great Britain | May 24, 1939 |

OTHER REFERENCES

German Plastics Practice, De Bell et al., 1946, page 79.